(12) United States Patent
Francis et al.

(10) Patent No.: US 11,706,201 B2
(45) Date of Patent: Jul. 18, 2023

(54) SECURE REMOTE COMPUTER SYSTEM

(71) Applicants: Airbus Defence and Space Limited, Hertfordshire (GB); Airbus Defence and Space GmbH, Munich (DE)

(72) Inventors: Patrick Francis, Hertfordshire (GB); Simon Bourne, Hertfordshire (GB); Erik Oliver Blass, Munich (DE)

(73) Assignees: Airbus Defence and Space Limited, Stevenage (GB); Airbus Defence and Space GmbH, Taufkirchen (DE)

( * ) Notice: Subject to any disclaimer, the term of this patent is extended or adjusted under 35 U.S.C. 154(b) by 114 days.

(21) Appl. No.: 16/513,827

(22) Filed: Jul. 17, 2019

(65) Prior Publication Data
US 2020/0028835 A1 Jan. 23, 2020

(30) Foreign Application Priority Data
Jul. 18, 2018 (GB) .................................. 1811759

(51) Int. Cl.
*H04L 9/40* (2022.01)
*G06F 21/60* (2013.01)
(Continued)

(52) U.S. Cl.
CPC ........ *H04L 63/0471* (2013.01); *G06F 21/602* (2013.01); *H04L 9/0618* (2013.01);
(Continued)

(58) Field of Classification Search
None
See application file for complete search history.

(56) References Cited

U.S. PATENT DOCUMENTS 8,245,037 B1 * 8/2012 Durgin ................. G06F 21/604
713/167
8,347,398 B1 * 1/2013 Weber .................... G06F 21/85
713/189

(Continued)

FOREIGN PATENT DOCUMENTS

WO 2016064888 A1 4/2016

OTHER PUBLICATIONS

Orellana et al.; "Privacy for Google Docs: Implementing a Transparent Encryption Layer"; 2010; retrieved from the Internet https://www.gradiant.org/images/stories/2010_cloudviews_googledocsprivacy.pdf; pp. 1-8 as printed. (Year: 2010).*

(Continued)

*Primary Examiner* — Michael W Chao
(74) *Attorney, Agent, or Firm* — Greer, Burns & Crain, Ltd.

(57) ABSTRACT

A system and method for secure cloud computing. The cloud based processing system comprises a user interface, allowing a user to enter and edit data, a proxy server, and a cloud based processing server. The user interface sends data entered by a user to the proxy server, which sends the encrypted data to the cloud based processing server. The proxy server receives editing commands from the user interface, and sends those commands to the cloud based processing server along with the encrypted data. The cloud based processing server receives the encrypted data and editing commands, applies the editing commands to the encrypted data, and sends the edited encrypted data back to the proxy server.

19 Claims, 2 Drawing Sheets

(51) Int. Cl.
- *H04L 9/06* (2006.01)
- *H04L 9/14* (2006.01)
- *H04L 67/10* (2022.01)
- *H04L 67/565* (2022.01)

(52) U.S. Cl.
CPC ............ *H04L 9/14* (2013.01); *H04L 63/0281* (2013.01); *H04L 67/10* (2013.01); *H04L 67/565* (2022.05)

(56) References Cited

U.S. PATENT DOCUMENTS

| | | | |
|---|---|---|---|
| 9,135,462 B2* | 9/2015 | Scharf .................. | H04L 9/0838 |
| 9,336,209 B1* | 5/2016 | Gupta .................... | G06F 16/93 |
| 9,448,978 B2* | 9/2016 | Lemonik ............... | G06F 40/143 |
| 9,547,769 B2* | 1/2017 | Aissi ..................... | H04L 63/20 |
| 9,679,155 B1 | 6/2017 | Grubbs | |
| 9,973,475 B2 | 5/2018 | Jain et al. | |
| 10,185,707 B2* | 1/2019 | Fay ........................ | G06F 40/12 |
| 10,915,646 B2* | 2/2021 | Xu ......................... | G06F 3/0604 |
| 10,956,667 B2* | 3/2021 | Danziger ............... | G06F 40/197 |
| 11,126,742 B2* | 9/2021 | Yeo ....................... | H04L 9/0866 |
| 11,182,410 B2* | 11/2021 | Keskar .................. | G06F 16/334 |
| 11,303,434 B2* | 4/2022 | Chen ..................... | H04L 9/0841 |
| 11,329,817 B2* | 5/2022 | Vijayanarayanan ......................... H04L 9/0891 | |
| 11,361,099 B2* | 6/2022 | Lahav ................... | H04L 9/0894 |
| 11,477,180 B2* | 10/2022 | Manges ................. | H04L 67/34 |
| 11,546,349 B2* | 1/2023 | Kuperman ............. | H04L 9/3234 |
| 2008/0077809 A1* | 3/2008 | Hayler .................. | H04L 63/0428 713/193 |
| 2008/0250242 A1* | 10/2008 | Bhogal .................. | H04L 9/00 713/167 |
| 2010/0318894 A1* | 12/2010 | Billharz ................ | G06F 40/166 715/255 |
| 2011/0078243 A1* | 3/2011 | Carpenter .............. | G06F 40/18 709/204 |
| 2012/0023570 A1* | 1/2012 | Gorodyansky ....... | H04L 63/0407 726/12 |
| 2012/0066769 A1* | 3/2012 | Latchem ............... | G06F 21/6263 726/26 |
| 2012/0185759 A1* | 7/2012 | Balinsky ............... | G06F 21/6227 715/209 |
| 2013/0067225 A1* | 3/2013 | Shochet ................ | G06F 21/6209 713/165 |
| 2013/0179985 A1* | 7/2013 | Strassmann ........... | G06F 21/60 726/26 |
| 2013/0212112 A1* | 8/2013 | Blom .................... | G06F 16/907 707/610 |
| 2013/0219176 A1* | 8/2013 | Akella .................. | H04L 63/0435 713/165 |
| 2013/0283038 A1* | 10/2013 | Kulkarni .............. | H04L 9/0861 713/153 |
| 2014/0006347 A1* | 1/2014 | Qureshi ................ | H04W 4/029 707/621 |
| 2014/0013112 A1* | 1/2014 | Cidon ................... | G06F 16/182 713/165 |
| 2014/0122866 A1* | 5/2014 | Haeger ................. | H04L 63/0471 713/153 |
| 2014/0250491 A1* | 9/2014 | Fleischman .......... | G06F 12/1408 726/1 |
| 2014/0298207 A1* | 10/2014 | Ittah ...................... | G06Q 10/00 715/753 |
| 2015/0039887 A1* | 2/2015 | Kahol .................. | H04L 63/0471 713/165 |
| 2015/0193628 A1 | 7/2015 | Maniatakos et al. | |
| 2017/0116166 A1* | 4/2017 | Burchett ............... | G06F 40/106 |
| 2017/0126638 A1* | 5/2017 | Ye ........................ | H04L 63/0428 |
| 2017/0359317 A1* | 12/2017 | Anderson ............. | G06F 21/602 |
| 2018/0234399 A1* | 8/2018 | Yin ....................... | G06F 21/60 |
| 2018/0255034 A1* | 9/2018 | Brunn ................... | H04L 9/0891 |
| 2020/0175186 A1* | 6/2020 | Guabtni ................ | G06F 21/6218 |
| 2022/0100872 A1* | 3/2022 | Kawabata ............. | G06F 21/30 |

OTHER PUBLICATIONS

Han et al.; "A general transformation from KP-ABE to searchable encryption"; 2014; retrieved from the Internet https://www.sciencedirect.com/science/article/pii/S0167739X13001921; pp. 1-9, as printed. (Year: 2014).*

Great Britain Search Report; priority document.

Thales Group, "Homomorphic Entryption: A guide to advance in the processing," Nov. 3, 2016.

Yang et al., "An Encrupted Image Editing Scheme Based on Homomorphic Encryption," Infocom 2015 Student Workshop (Poster Session).

* cited by examiner

SECURE REMOTE COMPUTER SYSTEM

CROSS-REFERENCES TO RELATED APPLICATIONS

This application claims the benefit of the United Kingdom patent application No. 1811759.8 filed on Jul. 18, 2018, the entire disclosures of which are incorporated herein by way of reference.

FIELD OF THE INVENTION

The present invention concerns a system and method for secure cloud computing. More particularly, but not exclusively, this invention concerns a system and method for cloud based processing of sensitive data.

BACKGROUND OF THE INVENTION

Cloud based computing is becoming increasingly popular, where cloud based computer servers receive data from one or more remote users, usually via the internet, and process and store that data. This allows various applications, such as word processing, databases, spreadsheets, etc. to be provided centrally on the cloud based server, rather than individually on the computer of each user. Set up and maintenance costs may be reduced compared to provision of traditional applications on a user's computer. For example, rather than having to update a number of machines when an application update is required, the update may be applied to the cloud based application. Cloud based computing may also provide advantages for sharing and editing of documents amongst a group of users.

One potential weakness of cloud based computing is that the provider of the cloud based computing application may have access to the data that is being processed, and the cloud also being vulnerable to hacking. Therefore, cloud based computing may be unsuitable for sensitive data. One solution may be the encryption of the data (for example, a word processing document) prior to storage on the cloud. However, the encryption still takes place using the cloud based computer server, and the data may still be vulnerable to unauthorized access, for example, prior to the encryption taking place.

Alternatively, the encryption may take place prior to sending the data to the cloud based server, and the cloud based server simply being used for storage purposes. However, this removes the potential advantage of being able to provide cloud based processing of data.

The present invention seeks to mitigate the above-mentioned problems. Alternatively or additionally, the present invention seeks to provide an improved system and method for the encryption and processing of data in cloud based computing systems.

SUMMARY OF THE INVENTION

According to a first aspect, the invention provides a cloud-based processing system, the cloud-based processing system comprising:
a user interface, configured to allow a user to enter and edit data,
a proxy server, and a cloud based processing server,
wherein the user interface is configured to send data entered by a user to the proxy server, and the proxy server is configured to receive and encrypt the data, and send the encrypted data to the cloud based processing server,
the proxy server further arranged to receive editing commands from the user interface, and send those editing commands to the cloud based processing server along with the encrypted data,
the cloud based processing server arranged to receive the encrypted data and editing commands from the proxy server, and apply the editing commands to the encrypted data, and send the edited encrypted data back to the proxy server.

The proxy server may be configured to decrypt the edited encrypted data.

The user interface may comprise a display screen. The user interface may comprise a keyboard, or other user input device. The display screen of the user interface may be configured to show a browser window, presenting an application interface to a user. An example application interface may be a screen showing a word processor document, a database, or other suitable application. The application may be hosted on the cloud based server, such that processing steps applied to the data entered into the user interface take place on the cloud based server.

The application provided by the cloud based server may be a word processor, and the data entered by the user may be shown on the display screen of the user interface in plain text. The editing commands entered by a user may include formatting changes, such as changes of text layout, the font of the text, the size of the text, or any other conventional editing command provided in word processor applications. The editing commands entered by a user may be used by the proxy server to package the plain text data, encrypt the data, and send the encrypted data along with the editing command, to the cloud based processor. The cloud based processor may be configured to receive the encrypted data, apply the editing command to the encrypted data, and send the edited encrypted data back to the proxy server. The proxy server may be configured to decrypt the edited encrypted data, and send the edited decrypted data to the user interface, such that the edited data is shown in plain text on the display screen of the user interface. For example, the plain text may be shown with a new paragraph entered, a font change, or any other conventional formatting change which may be chosen by a user.

The proxy server may be arranged to encrypt the data in packages, and send the corresponding packages of encrypted data to the cloud based processing server. Encryption of the data in packages may provide a more efficient system.

The proxy server and user interface may be part of the same device. The proxy server and user interface may be part of a network of devices, the network of device being protected by a firewall. The cloud based server is provided remotely from the proxy server and user interface.

The encrypted data may comprise one or more tags which identify the type of encrypted data to the cloud based server. The tags may be encrypted, and the cloud based server may comprise a key for decrypting the tags. The tags may allow some search functions to be provided by the cloud based server. Alternatively or additionally, the tags may allow some sorting functions to be provided by the cloud based server. Both the search and/or sorting functions may be provided by the cloud based server without the need for the cloud based server to have access to the plain text data entered by the user, thus maintaining the security of the data. The proxy server may encrypt the editing commands in addition to the data entered by a user, using a different encryption key such that the cloud based processing server was still unable to access the encrypted data it was processing. The encryption of the editing commands is preferably using a key which is shared with the cloud based processing server in order to allow the cloud based processing server to apply those commands to the necessary encrypted data. Alternatively, the editing commands may be sent in an unencrypted format.

According to a second aspect, the invention provides a method of secure cloud based processing, comprising the steps of:

providing plain text data to a proxy server;
providing an editing command to the proxy server;
the proxy server encrypting the plain text data into a package of encrypted data,
the proxy server sending the package of encrypted data and editing command to a cloud based processor,
the cloud based processor applying the editing command to the package of encrypted data to create an edited package of encrypted data,
the cloud based processor sending the edited package of encrypted data back to the proxy server,
the proxy server decrypting the edited package of encrypted data, thereby providing edited plain text data.

The plain text data may be provided to the proxy server via a user interface. The user interface may comprise a display screen and a keyboard (or other suitable input device).

The cloud based processor may comprise a word processing application. The user interface may display a browser window which shows a word processor interface, such that a user may enter and edit data in word processor documents via the browser window.

The proxy server may encrypt some of the plain text data in such a way that the cloud based processor may decrypt a limited amount of the plain text data. For example, in the case of a word processor document, the headings may be encrypted such that the cloud based server may decrypt them, in order that a search function may be provided at the cloud based processor. While the cloud based processor would not be able to search the whole of the encrypted document, a more limited searching function may still be useful. Alternatively or additionally, the proxy server may be arranged such that for each package of encrypted data, a set of key words is created, and attached to that package of encrypted data. The cloud based processor may be able to identify which packages of data include search terms, if those search terms correspond to the key words. So while the cloud based processor may not be able to exactly identify where a term was used, the package of data in which the term is used may be identified.

The encryption of the plain text data into a package of encrypted data may comprise the use of Cypher-text Policy Attribute Based Encryption.

The method may comprise the step of encrypting a first package of data with a first encryption key, and a second package of data with a second, different, encryption key. The use of a first and second encryption key may allow data to be classified for access by different categories of user, for example users with different levels of security clearance.

The method may comprise the step of the proxy server selecting a default encryption key, for example based on a user based attribute. For example, if a user has a certain level of security clearance, the default encryption key may be chosen such that only users with the same or higher security clearance would be able to access and decrypt the encrypted data once it has been stored in the cloud. The method may comprise the step of a user selecting an alternative to the default encryption key. Typically, this would be to encrypt the data using a key which was accessible to users with a lower security clearance, otherwise the user inputting data would not be able to access the data once it was sent from the user interface to the cloud based processor. However, it could be possible that the security clearance was higher than the user inputting the data. The method may also comprise the step of the user selecting at least a section of the data that has already been encrypted using the first (possibly default) encryption key, and encrypting the data according to a second, different encryption key. This step would allow a document to be classified in different ways (with certain sections made more or less secure) once the data has initially been entered via the user interface.

It will of course be appreciated that features described in relation to one aspect of the present invention may be incorporated into other aspects of the present invention. For example, the method of the invention may incorporate any of the features described with reference to the apparatus of the invention and vice versa.

BRIEF DESCRIPTION OF THE DRAWINGS

Embodiments of the present invention will now be described by way of example only with reference to the accompanying schematic drawings of which.

DETAILED DESCRIPTION OF THE PREFERRED EMBODIMENTS

Figure 1:
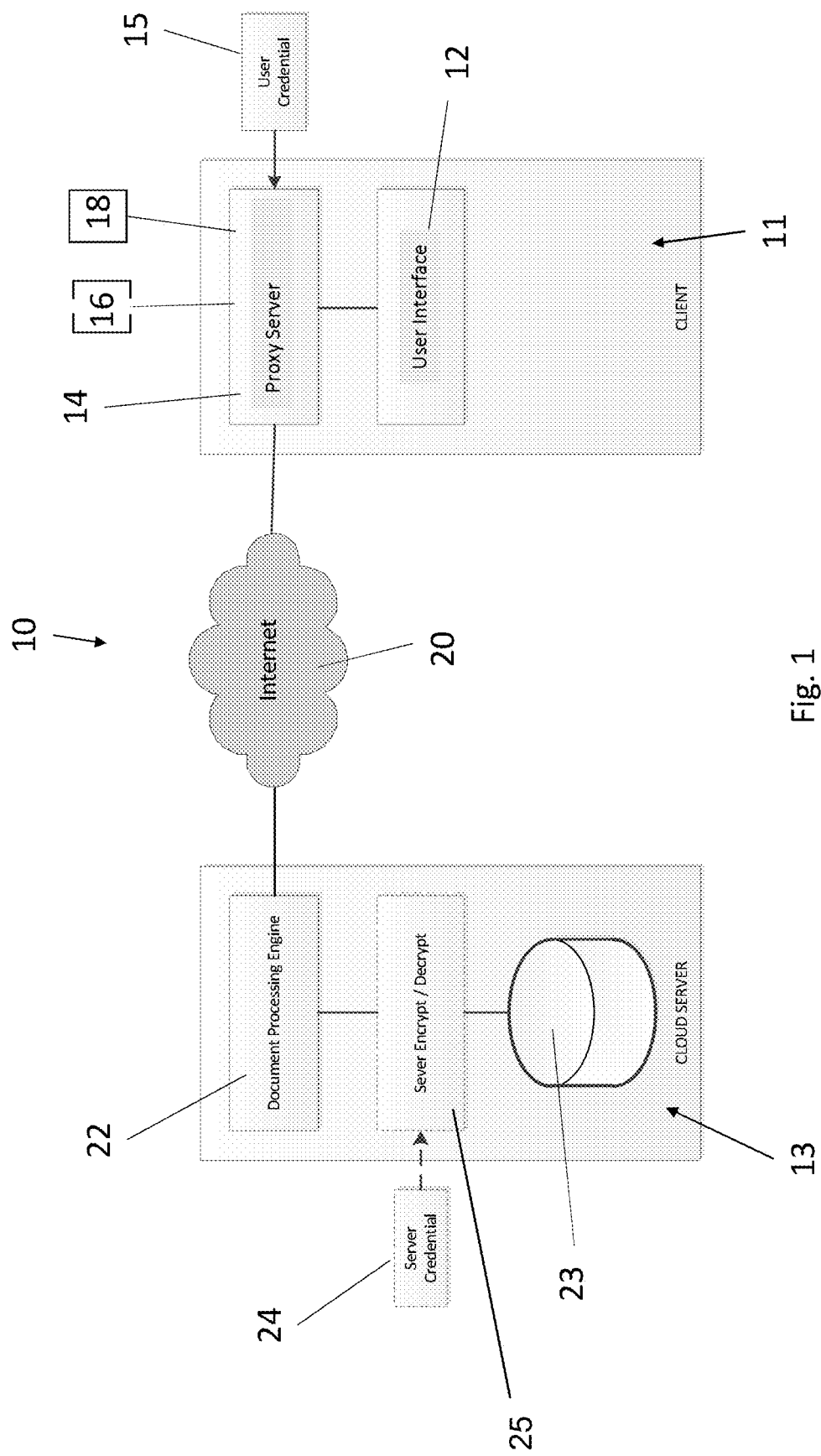
FIG. 1 shows a schematic representation of a system according to a first embodiment of the invention.

FIG. 1 shows a schematic representation of a system according to a first embodiment of the invention. The system 10 comprises a client 11 and a cloud server 13 connected via the internet 20. The client 11 comprises a user interface 12. The user interface 12 may be a computer device, including a user input, such as a keyboard, and a display device, such as a screen. The user interface 12 acts to provide a browser via which a user may interact with the cloud server 13, through the proxy server 14. The user interface 12 may be used by a user to create, edit, and read, documents, such as word processor documents. However, the user interface 12 does not include the application required to process the data a user inputs into the user interface 12. Instead, that data is sent from the user interface 12 to a proxy server 14 of the client 11. In this case, the proxy server 14 is part of the same computer device as the user interface 12. However, the skilled person will appreciate that the proxy server 14 may be located remotely from the user interface 12, for example being at the boundary firewall of a network of which the user interface 12 is part. In such an arrangement, the proxy server 14 may receive data from a number of user interfaces 12. The proxy server 14 includes an encryption engine 16 and decryption engine 18. The encryption engine 16 is arranged to receive the plain text data from the user interface 12, and encrypt the data before it leaves the proxy server 14. Once the data is encrypted, the proxy server is arranged to send the encrypted data, via the internet 20, to a cloud based server 13. The cloud based server 13 includes a document processing engine 22 including an application arranged to process the encrypted data, and a memory 23 arranged to store the changes made to the encrypted data. For example, the application may be a word processing application, and the changes to the data may include formatting steps applied to a document made up of that data.

The user interface 12 shows a browser on the user interface display, that browser being linked to the cloud based server 13 via the proxy server 14. When a user inputs data into the user interface 12 via the user input, the user display shows that data, for example, the text that has been typed in by a user, in plain text. In that way, the experience of the user is the same as when creating a conventional word processing document. The proxy server 14 may store the plain text entered by the user until the user enters a formatting command, for example adjusting the font of the text, or hitting the return key of the keyboard to add a paragraph break. On that trigger, the encryption engine 16 of the proxy server 14 encrypts that package of data and the proxy server 14 sends the encrypted data, along with the editing command, via the internet 20 to the document processing engine 22. Once the encrypted data has been received by the document processing engine 22, the document processing engine 22 is arranged to send a screen update command back to the user interface 12 via the proxy server 14. The user interface display then updates to show the formatting change entered by the user, and the user continues to work on the document as before.

The cloud based server 13 optionally includes a limited encryption/decryption engine 25 which allows a certain subset of data to be decrypted, for example to allow a limited searching function to be provided by the document processing engine 22. The cloud based server 13 comprises a server credential 24, and the proxy server 14 may be arranged to encrypt the data packages such that authorized servers, such as the server 13 may decrypt the designated parts of the package.

Encryption and sending of the data in packages may increase the efficiency of those two operations. Alternative ways in which the data may be packaged for encryption and sending to the document processing engine 22 may be the input of a certain number of text characters, for example, the encryption step may take place every time 200 characters are input into the user interface, and that package of encrypted characters then sent via the internet 20 to the cloud based server 13. The skilled person will appreciate that there are a number different ways in which the data may be divided into packages, and still fall within the scope of the embodiment described.

Figure 2:
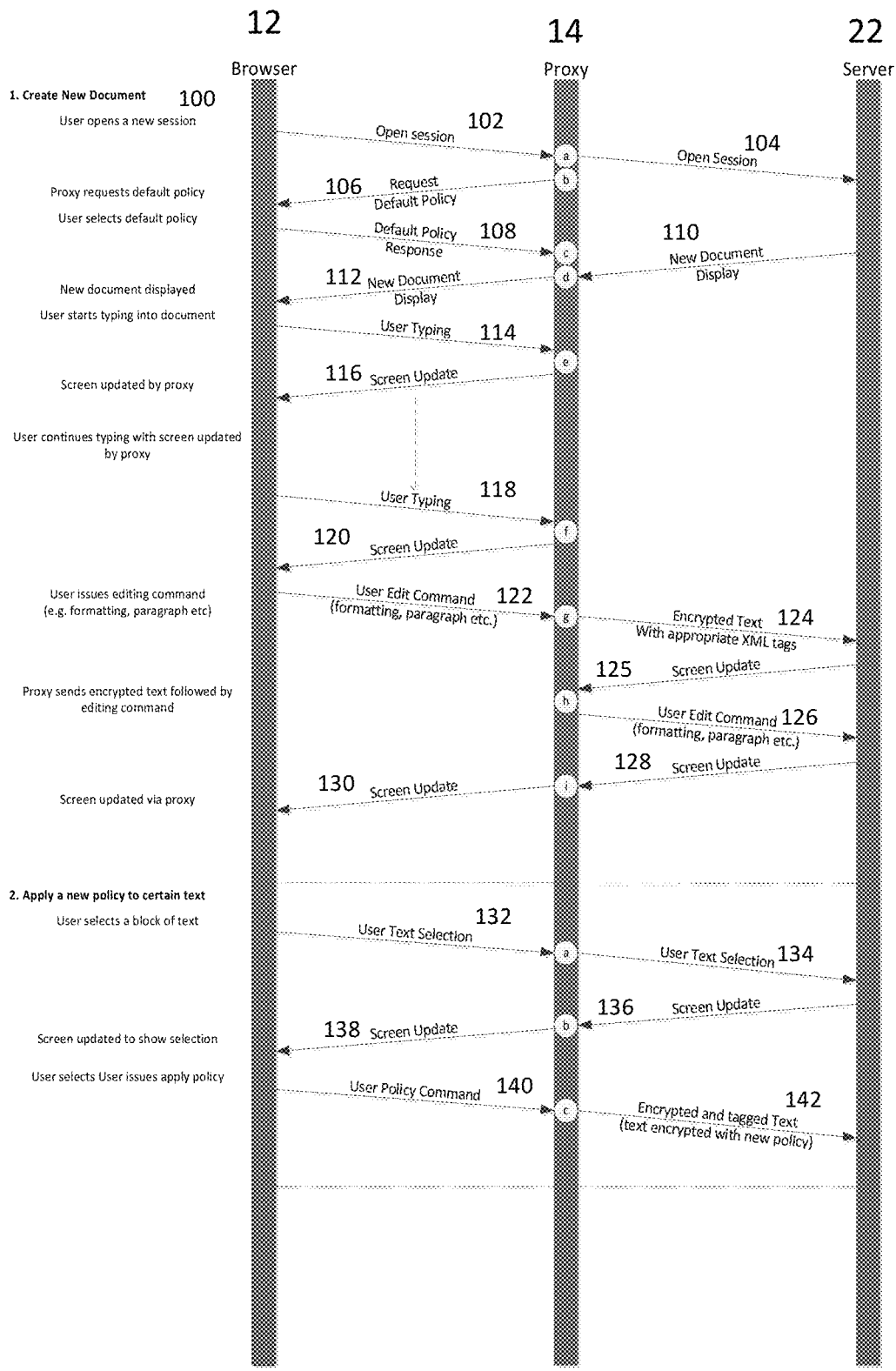
FIG. 2 shows a process diagram according to a second embodiment of the invention.

FIG. 2 is a process diagram showing a series of process steps involved in creating and editing a new document using the system as described with reference to FIG. 1.

Initially, the user opens a new session 100 on the user interface browser. The user interface then sends an open session request 102 to the proxy server. The proxy server then sends an open session request 104 to the cloud based server.

The proxy server, in response to the open session request 102, sends a default policy request 106 to the user interface. The default policy provides the proxy server with the necessary information regarding the level of security to be provided to the document information, and may include user attribute data, which may be used for attribute data encryption techniques. Further information regarding the potential encryption techniques will be provided below. In response to the default policy request 106, the user selects the default policy via the user interface, and the user interface sends a default policy response 108 to the proxy server.

In response to the open session request 104, the cloud based server sends a new document display request 110 to the proxy server. The proxy server then sends a new document display request 112 to the user interface, and the user interface displays a new document.

Once the user interface is displaying a new document, the user begins to type, with the data input by typing being sent from the user interface to the proxy server 114. The proxy server sends a screen update command 116 to the user interface, where the display screen is updated to show the typed information in a plain text format. The user continues to type, with the data continuing to be sent from the user interface to the proxy server 118, and corresponding screen updates 120 sent from the proxy server to user interface.

This continues until the user enters an editing command, for example a formatting command such as a font change or new paragraph 122. The proxy server isn't configured to make such formatting changes, so the proxy server encrypts the text using the default policy, and sends the encrypted text 124, and the editing command 126 to the cloud based server. The cloud based server receives the encrypted text and editing command, applies that editing command to the encrypted text, and sends a screen update 128 back to the proxy server. The proxy server decrypts the encrypted text including the editing command changes, and sends the amended plain text back to the user interface in the form of a new screen update 130.

As can be appreciated by a skilled person, the method as set out above allows a cloud based processing program to be used to receive and process encrypted data, without the unencrypted data being disclosed to the cloud.

The encryption policy selected as the default policy for encrypting data may be one of a number of suitable encryption policies as would be understood by the skilled person. One example is Cypher-text Policy Attribute Based Encryption (CPABE), which combines encryption and fine grained access control by encrypting data based on a set of policy attributes that only users with a credential matching those attributes can decrypt the data. For example, data may be encrypted such that only users of a certain seniority or higher (such as Captain, Major, General, etc.) are able to access, and decrypt the data.

FIG. 2 shows a number of additional steps which may be undertaken, whereby a user wants to apply a new security policy to at least certain sections of the text in a document. The user may first select a section of text 132, the user interface sending the selection command to the proxy server. The proxy server then sends the text selection on 134 to the cloud based server. A screen update command 136 is sent from the cloud based server to the proxy server, and a further screen update command 138 sent from the proxy server to the user interface. The user interface then displays the area of text selected by the user, and the user selects a new policy to be applied to the selected text. The user policy command 140 is sent from the user interface to the proxy server, where the proxy server encrypts the selected text according to the new policy. The encrypted text is then sent to the cloud based server. In such a way, a document may be created where some sections of text are classified differently to other sections of text, such that the most sensitive information in the document may be restricted to a smaller subset of users than the document as a whole.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cloud based processing system comprising:
    a user interface, configured to allow a user to enter and edit data, wherein the data comprises text, and wherein the user interface comprises a display screen and a user input device, the display screen of the user interface configured to show a browser window, presenting an application interface to a user,
    a proxy server, and
    a cloud based processing server,
    wherein the user interface is configured to send data entered by a user to the proxy server, and the proxy server is configured to receive and encrypt the data, and send the encrypted data to the cloud based processing server,
    the proxy server further configured to receive editing commands from the user interface, and send those editing commands to the cloud based processing server along with the encrypted data, wherein the editing command comprises a formatting command for formatting the text entered by the user,
    the cloud based processing server being configured to receive the encrypted data and the editing commands from the proxy server, apply the editing commands to the encrypted data to provide edited encrypted data, and send the edited encrypted data back to the proxy server.

2. The cloud based processing system as claimed in claim 1, wherein the proxy server is configured to decrypt the edited encrypted data received from the cloud based processing server.

3. The cloud based processing system as claimed in claim 1, wherein the application interface corresponds to an application hosted on the cloud based processing server.

4. The cloud based processing system as claimed in claim 3, wherein the application provided by the cloud based processing server is word processor application.

5. The cloud based processing system as claimed in claim 1, arranged such that the editing commands entered by a user act to prompt the proxy server to package the user entered data, encrypt the data, and send the encrypted data along with the editing command, to the cloud based processing server.

6. The cloud based processing system as claimed in claim 1, wherein the cloud based processing server is configured to receive the encrypted data, apply the editing command to the encrypted data, and send the edited encrypted data back to the proxy server.

7. The cloud based processing system as claimed in claim 6, wherein the proxy server is configured to decrypt the edited encrypted data, and send the edited decrypted data to the user interface.

8. The cloud based processing system as claimed in claim 1, wherein the proxy server and user interface are part of the same computing device.

9. The cloud based processing system as claimed in claim 1, wherein the proxy server and user interface are part of a network of devices, the network of devices being protected by a firewall.

10. The cloud based processing system as claimed claim 1, wherein the encrypted data comprises one or more tags which identify the type of encrypted data to the cloud based processing server.

11. A method of secure cloud based processing, comprising the steps of:
    providing plain text data to a proxy server;
    providing an editing command to the proxy server, wherein the editing command comprises a formatting command for formatting the plain text data;
    the proxy server encrypting the plain text data into a package of encrypted data,
    the proxy server sending the package of encrypted data and editing command to a cloud based processor,
    the cloud based processor applying the editing command to the package of encrypted data to create an edited package of encrypted data,
    the cloud based processor sending the edited package of encrypted data back to the proxy server,
    the proxy server decrypting the edited package of encrypted data, thereby providing edited plain text data comprising the plain text data with the editing command applied thereto.

12. The method as claimed in claim 11, further comprising the step of the plain text data being provided to the proxy server via a user interface.

13. The method as claimed in claim 12, wherein the cloud based processor comprises a word processing application.

14. The method as claimed in claim 13, further comprising the step of the user interface displaying a browser window which shows a word processor interface.

15. The method as claimed in claim 11, further comprising the step of the proxy server encrypt some of the plain text data in such a way that the cloud based processor may decrypt a limited amount of the plain text data.

16. The method as claimed in claim 11, wherein the step of encryption of the plain text data into a package of encrypted data may comprises the use of Cypher-text Policy Attribute Based Encryption.

17. The method as claimed in claim 11, further comprising the step of encrypting a first package of data with a first encryption key, and a second package of data with a second, different, encryption key.

18. The method as claimed in claim 11, further comprising the step of the proxy server choosing a default encryption key.

19. The method as claimed in claim 11, further comprising the step of a user selecting between a choice of a default encryption key or an alternative encryption key.

* * * * *